No. 756,328. PATENTED APR. 5, 1904.
S. B. CHRISTY.
RECOVERY OF GOLD AND SILVER FROM CYANID SOLUTIONS.
APPLICATION FILED MAY 20, 1901.
NO MODEL. 2 SHEETS—SHEET 1.
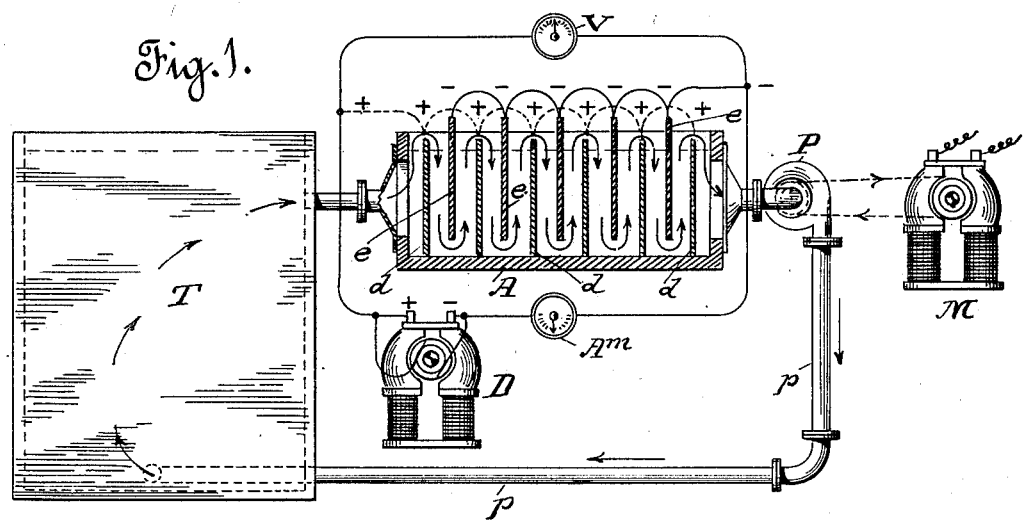
Fig. 1.
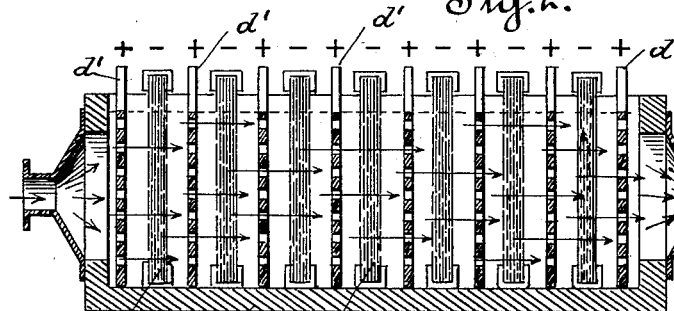 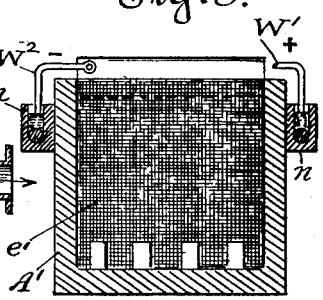
Fig. 2. Fig. 3.
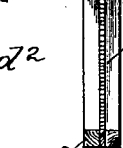 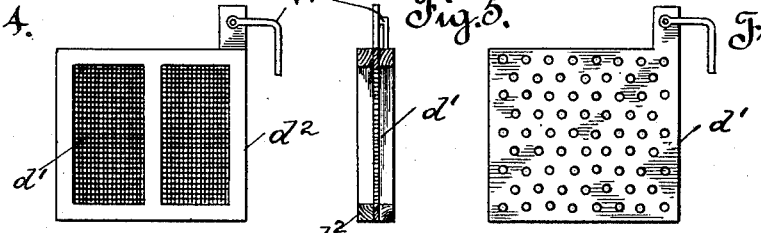 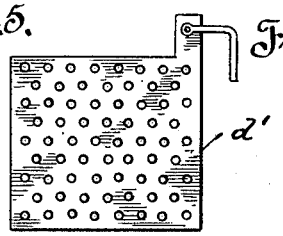
Fig. 4. Fig. 5. Fig. 6.
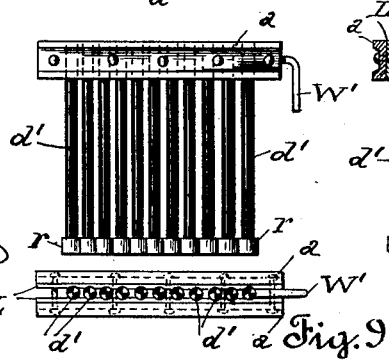 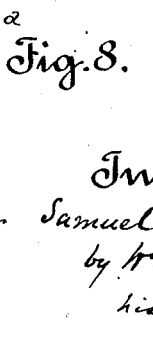
Fig. 7. Fig. 8.
Fig. 9.
Witnesses.
F. E. Monteverde
Walter F. Vane
Inventor.
Samuel B. Christy
by Wm. F. Booth
his Attorney.
THE NORRIS PETERS CO., PHOTO-LITHO., WASHINGTON, D. C.

No. 756,328. PATENTED APR. 5, 1904.
S. B. CHRISTY.
RECOVERY OF GOLD AND SILVER FROM CYANID SOLUTIONS.
APPLICATION FILED MAY 20, 1901.
NO MODEL. 2 SHEETS—SHEET 2.
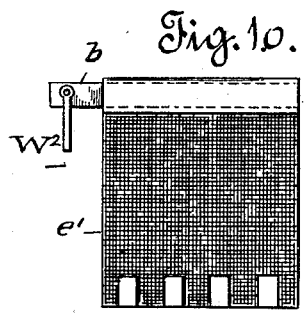
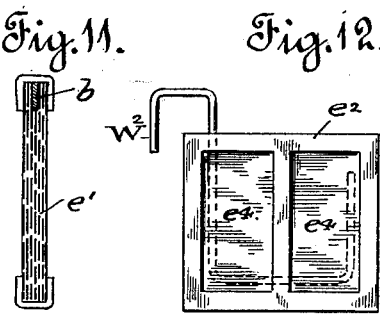
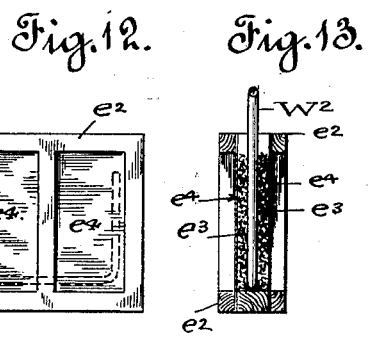
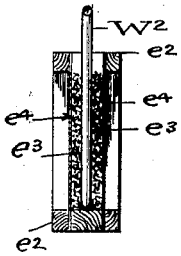
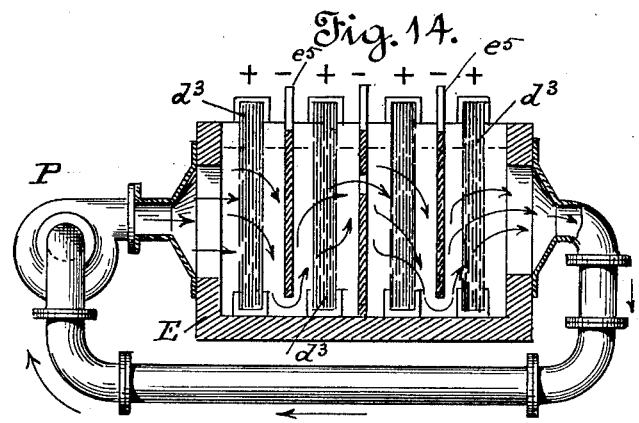
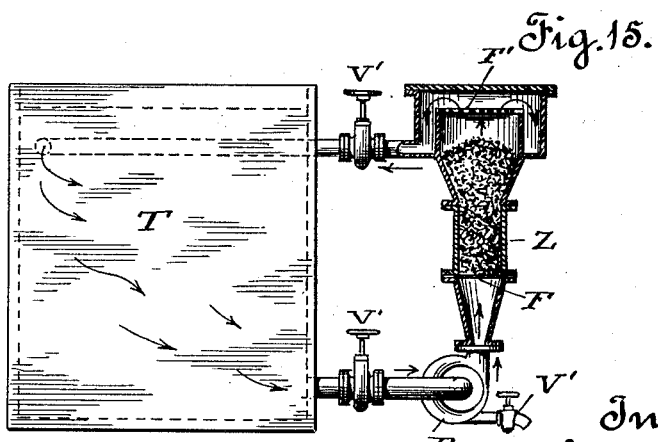

No. 756,328. Patented April 5, 1904.

UNITED STATES PATENT OFFICE.

SAMUEL B. CHRISTY, OF BERKELEY, CALIFORNIA.

RECOVERY OF GOLD AND SILVER FROM CYANID SOLUTIONS.

SPECIFICATION forming part of Letters Patent No. 756,328, dated April 5, 1904.

Application filed May 20, 1901. Serial No. 60,979. (No specimens.)

*To all whom it may concern:*

Be it known that I, SAMUEL B. CHRISTY, a citizen of the United States, residing at Berkeley, Alameda county, State of California, have invented certain new and useful Improvements in the Recovery of Gold and Silver from Cyanid Ore-Extraction Solutions; and I do hereby declare the following to be a full, clear, and exact description of the same.

My invention relates to the recovery of gold and silver by electrochemical means from the extremely dilute solutions that result from the extraction of gold and silver ores, tailings, and concentrates.

My invention consists in the novel processes hereinafter described and claimed.

There are two great difficulties in the recovery of gold and silver from such dilute solutions. The first lies in their extreme dilution. They are seldom richer in gold than one one-thousandth to one ten-thousandth per cent. and must often be reduced to one one-hundred-thousandth per cent. gold or less. The second lies in the fact, not generally known, that the electric current acts differently on metallic cyanids than it does on other metallic compounds in solution. Ordinarily the metal forms the cathion in electrolysis and travels directly to the cathode. In metallic cyanids such as gold and silver the gold and silver form with cyanogen complex anions and are transported to the anode and not to the cathode. Thus potassium aurocyanid ($KAuCy_2$) splits up into the cathion potassium, ($K$,) which travels to the cathode, and an anion, gold dicyanid, ($AuCy_2$,) which travels to the anode and in the absence of free potassium cyanid is precipitated there as a pale yellow slime. Ordinarily it is redissolved by the free potassium cyanid usually present to form potassium aurocyanid, thus enriching in gold the solution at the anode. The gold at the cathode is precipitated by a secondary reaction of the potassium cathion on the potassium aurocyanid there present; but by the passage of the electric current for every atom of gold precipitated at the cathode two are removed from the vicinity of the cathode, until finally the potassium cathion finds no gold to precipitate, and it wastes itself in decomposing water to no useful purpose. Meantime the travel of the gold-bearing anion to the anode has greatly enriched the solution at that point, also to no useful purpose. Consequently an electric current of great density cannot be used, for it mostly wastes itself to no useful purpose in decomposing water, and the gold that is precipitated is thrown down as a fine, slimy, non-adherent powder that is easily washed off and lost. Hence only electric currents of small density can be used, and the whole operation is rendered slow and inefficient. This is the greatest obstacle in the electrochemical precipitation of gold and silver from cyanid solutions; but this, the real difficulty, is not generally understood, and attempts to increase the efficiency of the precipitation have consequently been merely to enormously increase the electrode-surface and the size of the deposition-box. This, however, leads to great expense and awkwardness of construction. Thus to handle one thousand tons of solution per day by the best system hitherto in use a deposition-box holding at least six thousand cubic feet with a cathode area of from two hundred thousand to three hundred thousand square feet is necessary. The construction of the deposition-box becomes very costly, and the distribution of gold and silver over this enormous cathode area also renders their final recovery difficult and expensive; but this method is also indirect and inadequate. The method by which I have been able to overcome this difficulty, by directly attacking it, has been after clarifying from sediment, by filtration or settling, the solution to be treated to collect it in a large storage tank or reservoir and then to circulate it through a suitable electrochemical cell and back again to the storage-tank rapidly and repeatedly in such a manner that the solution is brought into intimate contact with anodes and cathodes in rapid alternation until the gold and silver content has been sufficiently reduced.

By my improved process I have been able to handle such solution at a rate corresponding to one thousand tons a day in a deposition-box of only thirty cubic feet and have secured better precipitation than has ever before been obtained with a deposition-box holding six thousand cubic feet.

When the solution is free from sediment and the ore leaches rapidly enough, instead of collecting it in a storage-tank I may use the ore-extraction tank as a storage-tank, pumping the solution from below the filter and returning it on top of the ore.

Referring now to the accompanying drawings, I show suitable means and apparatus for carrying out my invention.

Figure 1 is a general view of an apparatus in which my invention may be carried out. Fig. 2 is a longitudinal vertical section of a preferable form of deposition-box with pervious electrodes for the application of my process in connection with an external electric current. Fig. 3 is a vertical cross-section of the same. Fig. 4 is an elevation of the mounting of a pervious anode, of wire-cloth. Fig. 5 is a vertical cross-section of same. Fig. 6 is an elevation of a pervious electrode, of sheet metal. Fig. 7 is an elevation of a composite carbon anode; Fig. 8, a vertical section of same. Fig. 9 is a horizontal plan of the electric connections for the same. Fig. 10 is an elevation of a composite pervious wire-cloth cathode. Fig. 11 is a vertical section of same. Fig. 12 is an elevation of a pervious cathode composed of fragments of electrocarbon or other conducting substance mounted in a suitable frame. Fig. 13 is a vertical section of same. Fig. 14 is a vertical section of an improved form of clean-up box. Fig. 15 is a general view of the application of my process with a form of deposition-box with pervious electrodes in connection with an internal source of electric current.

The general process is shown in Fig. 1. T is the storage-tank for the solution; A, the deposition-box or electrochemical cell. This shows the anodes $d$ (marked $+$) and the cathodes $e$, (marked $-$). These are connected in parallel with a shunt-wound or separately-excited dynamo D, provided with a suitable ammeter A$m$ and a voltmeter V. The solution flows through the deposition-box A from the tank T through a suitable centrifugal pump P, driven by a motor M, and back again through pipe $p$ to the tank, and so on, rapidly, continuously, and repeatedly and in such a manner that the solution is brought into intimate contact with anodes and cathodes in rapid alternation until the gold and silver content has been sufficiently reduced, when the solution is discharged and a new lot treated.

Fig. 1 shows the common form of deposition-box A, with removable cathodes $e$. The solution flows in a zigzag course through the box, as shown by the arrows; but the form of deposition-box or electrochemical cell that I prefer is one with pervious electrodes, as shown in Figs. 2 and 3. In these figures the box is designated by A', and the anodes $d'$ are marked with the plus sign, ($+$.) They may be made of any electroconducting substance not too much acted on by the solution—such as iron, lead, peroxid of lead, platinum, or for pressures not exceeding 1.5, or even, in some cases, 2.5 to four volts, dense carbon or graphite anodes may be used. The anodes $d'$ (marked with the sign $+$) may be constructed in the form of wires, rods, or gauze, or perforated sheets in any form or manner to be pervious to the solution. The wire-gauze $d'$ is best mounted to prevent contact with the cathodes in a paraffined wooden frame $d^2$, as in Figs. 4 and 5, electrically connected with an amalgamated copper wire W'. The perforated sheet-metal anodes $d'$ are constructed as in Fig. 6. The graphite or carbon anodes may be similarly constructed of perforated blocks; but I prefer to construct them of the densest graphite or electrode carbon rods $d'$, mounted, as in Figs. 7, 8, and 9, in which $a$ $a$ represent paraffined wooden frames, inclosing electroconducting-strips L, which are connected with the amalgamated copper wire W'. The electroconducting-strips make electric contact with the carbon rods placed about one-eighth inch apart. At $r$ are shown short strips of rubber hose to prevent contact with the cathodes. Of these various anodes those of platinum or platinum-iridium wire-cloth are the most perfect, but the most expensive. Still on account of the small size of my deposition-box they may be used in some cases, particularly with denser currents. Those of perforated sheet-iron or coarse iron wire-cloth are cheapest. The residues of Prussian blue and ferric hydrate resulting from their use are small, except when alkaline sulfates and chlorids are present. Their gold and silver content is easily extracted by an aerated cyanid solution. Those of lead give rise to a white coating of lead cyanid. Those of peroxidized lead are little acted on, but both give traces of lead in the precipitate. Those of dense carbon or graphite are not disintegrated if the voltage does not rise above 1.5 volts. The solution is only faintly discolored, and by circulating the solution after the precious metals are extracted through a centrifugal pump arranged to aspirate air, as well as solution, it becomes as capable of dissolving gold and silver as a fresh solution of the same strength. I have found some carbon and graphite anodes to stand as much as 2.5 to four volts so long as the solution was in active circulation, while they would disintegrate at that pressure if the solution was at rest or in very slow motion, so that the free oxygen had time to act on them. The pervious cathodes I prefer to construct with a greater precipitating-surface than the anodes. They may be constructed of any electrically-conducting substance not too much acted on by the solution. Platinum wire-gauze is the best, but is ordinarily too expensive. I have found that No. 24 Birmingham wire-gage iron wire-cloth, sixteen meshes per linear inch, is sufficiently satisfactory. The wire-cloth is cut to a size to fit the box, and the sheets $e'$ are clamped together, as in Figs. 10 and 11, in bunches of five or ten sheets electrically connected with a sheet-iron strip $b$, to which is riveted an amalgamated copper wire $W^2$. Before clamping together the sheets of wire-gauze they are preferably heated to dull redness for about one minute to burn off the layer of oil usually left on the surface by the manufacturer and to coat them with a very thin coating of magnetic oxid of iron. They should not be left exposed to the heat too long or a thick scale forms that easily cracks off. When not in actual use, the cathodes should be rapidly dried first by hot steam and then by hot air or on a hot iron plate. In this way corrosion and rusting may be substantially prevented. Instead of iron wire-gauze any other pervious conducting substance may be used as a cathode, such as metallic filaments or cloth saturated with precipitated silver, gold, or other metal exposing large surface. This may be most easily accomplished by using a sheet of metallic wire-cloth (of iron, for instance) as a basis for a cathode in a suitable electrochemical cell provided with pervious anodes, through which is circulated a strong solution of gold, silver, copper, lead, or other electronegative metal during the passage of a very dense electric current, so as to precipitate said metal on the surface of the wire-cloth in a pervious or spongy layer, thus forming an electrolytic filter of enormous cathode area in a small compass. The anodes and cathodes thus formed may be arranged as in Fig. 2 or they may be arranged horizontally one above the other in any suitable manner, provided the dilute cyanid solutions from which the gold and silver are to be now removed are forced to circulate through said pervious anodes and cathodes in repeated and rapid alternation. Also granulated metal or pulverized coke or electrocarbon-dust $e^3$ properly sized may be placed in a wooden framework $e^2$, covered with cheese-cloth $e^4$, and electrically connected by an iron wire ending in an amalgamated copper wire $W^2$, as shown by Fig. 12 in elevation and by Fig. 13 in section. The electrodes are separated to prevent short-circuiting and are kept from one-half to one-fourth inch apart. In Figs. 2 and 3 the arrangement of such a deposition-box with pervious anodes and removable pervious cathodes is shown. Electric connections in parallel are made with the anodes and cathodes, as shown by the sectional view Fig. 3, by the box $m$, connected with the negative pole, and by the box $n$, connected with the positive pole, of the dynamo. The wooden boxes $m$ and $n$ contain omnibus-bars of amalgamated copper and connecting holes filled with mercury, into which the wires $W'$ from anodes and $W^2$ from cathodes dip.

The box $A'$ (shown in Figs. 2 and 3) is placed in the position shown in A in Fig. 1, being substituted for box A, and the solution is forced to circulate from tank T through the box $A'$ and through the pervious anodes and cathodes repeatedly and back again, so as to be brought into intimate contact with anodes and cathodes in rapid alternation until its gold and silver content is sufficiently reduced. When the voltage is kept constant at any point—say at two volts, for instance—the conclusion of the treatment is readily ascertained without the necessity of constant assays of solution by the number of amperes of electric current. This number is high at first and suddenly drops to a lower constant level, when the gold and silver content of the solution is substantially exhausted; but as in some cases the fall of electric current might be due to an accidental increase of resistance it is always necessary to assay the solution before discharging the lot under treatment.

The advantages of this system of rapid and repeated circulation of the solution through pervious anodes and cathodes in rapid alternation are very great. The impoverished solution about each cathode is constantly and directly replenished by the enriched solution from the preceding anode, and the electric current is thus utilized much more completely and a denser electric current may be used and more rapid precipitation in a smaller tank may be effected. The velocity of the solution should be such that the potassium ions formed by the electric current always find gold solution brought to them by the flow of the solution, and this is indicated by the fact that the evolution of hydrogen substantially ceases at the cathodes. When this takes place, the electricity is all utilized in precipitating gold and silver. The necessary velocity of flow increases with the diminution of the gold and silver content and with the strength of the electric current. With a solution containing six ounces silver and gold per ton and voltages of 1.5 to three volts I have found a velocity of flow through the box of one-third inch to one inch per second ordinarily sufficient. I prefer to so regulate the flow of solution that the evolution of gas at the cathodes substantially ceases; but I do not confine myself to this speed, as it is sometimes convenient to work with denser electric currents, with which a slight evolution of gas may be allowed. In this case a smaller and less expensive deposition-box may be used; but this is done at a greater expense for electricity. I have experimented with velocities of solution-flow ranging from nothing to upward of twelve feet per minute. The velocity of flow used in the most successful system hitherto in use is about one-fourth foot per minute, and as the deposition-box has been hitherto constructed the enriched solution at the anode has to flow from six to eight feet before it can reach the next cathode by the shortest path possible in the line of flow. Hence its alternate contacts take place about every thirty minutes. According to my process with a flow of one foot per minute these alternate contacts of solution with anodes and cathodes take place at least ten times per minute or three hundred times in a half-hour instead of once, as is now the practice. I prefer to circulate the solution at a velocity of not less than one foot per minute unless, as is the case with strong solutions, the evolution of hydrogen at the cathode substantially ceases with a lower rate of flow, and I also prefer to increase the rate of flow in proportion as the gold and silver become exhausted from the solution. With very dense electric currents also I prefer to increase the rate of flow as the density of the electric current increases. After having experimented with all pressures from one to fifty volts I find 1.5 volts usually sufficient for silver, a slightly-higher voltage better for gold, and that two, 2.5, or three volts give good electric efficiency; but with pervious electrodes and active circulation I am able to use even higher voltages with the advantage of denser currents and less cost in construction, though the electric current is less efficiently utilized.

To show the advantages of my process, I may state that whereas heretofore with the best electrodeposition methods now in use in order to precipitate one thousand tons of solution in twenty-four hours, the smallest deposition-box ever used holds two hundred tons of solution. With my process I have been able to precipitate at such a rate that I can handle this amount of solution in a deposition-box holding only one ton. Moreover, by the old system only seventy-five or eighty per cent. of the precious metals are recovered at this rate, while by my process I have been able to recover at the same rate in the box two hundred times smaller from ninety to ninety-nine per cent. of the precious metals. As far as I am aware this has never been accomplished before. Moreover, from solutions containing silver cyanid I have been able to recover fully half the cyanid combined with the silver, so that the solution has assayed higher in cyanid after the silver was precipitated than it did when it entered the box. With rich silver solutions the increase in cyanid titration has reached as high as 0.1 per cent. and with six-ounce silver per ton has often reached 0.01 per cent. To my knowledge this has never been accomplished before. Moreover, the best that has hitherto been accomplished with deposition-boxes with external electric current has been to utilize five per cent. of the electric current, the other ninety-five per cent. being wasted. Usually not over one per cent. to two per cent. is utilized. I have been able to utilize over eighty per cent. of the electric energy and ordinarily average ten per cent. to twenty per cent. for the entire precipitation.

I prefer to concentrate the gold and silver thus deposited on removable cathodes in the manner covered by my former patent, No. 643,096, February 6, 1900; but I have been able to so increase the precipitating capacity of my deposition-box by the new method here described that it has outstripped the capacity of the clean-up box, as shown in my former patent. I have, however, been able to apply the same principle of rapid circulation to that also, and thus increase its capacity. Fig. 14 shows how this is effected. A centrifugal or other pump P forces the cyanid solution, which should be as far as possible free from chlorids and sulfates, to flow rapidly through the clean-up box E repeatedly, preferably, though not necessarily, at such a rate as to substantially prevent the evolution of gas at the cathodes. These consist, preferably, of sheets of iron $e^5$, marked —, and arranged, as in the figure, so as to force the solution to pass alternately up and down through the box and at the same time through the pervious secondary anodes $d^3$, marked +. These secondary anodes are the gold and silver laden primary cathodes $e'$ from the deposition-box of Figs. 2 and 3. Although I prefer pervious cathodes $e'$ to collect the silver and gold in the deposition-box, I may also use impervious cathodes $e$, as in Fig. 1. Their gold and silver content is concentrated on the secondary cathodes in a similar manner. The secondary cathodes $e^5$, of sheet iron or other metal (marked —) are before being inserted in the clean-up box coated with a very thin layer of electroplater's graphite and vaseline. With an electromotive force of about one-half volt the gold and silver are rapidly removed from the removable secondary anodes $d^3$ (primary cathodes $e'$ in the deposition-box) and deposited on the secondary cathodes $e^5$, whence they may be pulled off as solid sheets at convenient intervals ready for the mint without further treatment. I have thus produced solid sheets of bullion one-eighth inch thick and nine hundred and ninety-six fine. If an extremely dense electric current is used in the clean-up box, the gold and silver will be deposited on the secondary cathodes in the form of a loose powder, which is easily removed by a stiff brush and can be then melted down into bars. The rapid circulation of the solution enables the concentration of the metal to go on with a denser current, and hence more rapidly and in a smaller box. It is also evident that the same result may be obtained as follows: Instead of having two separate boxes—i. e., a deposition-box and a clean-up box—the deposition-box may serve both purposes in alternation. This is particularly the case when the pervious cathodes of broken carbon or graphite are used, for these being bulky are inconvenient to remove to a cleanup box. Instead of doing this when these cathodes in said deposition-box are sufficiently charged with gold and silver from the circulation of a large volume of cyanid-ore solution, the circulation from the storage-tank is cut off. Either the same or, better, a fresh cyanid solution is then made to circulate rapidly and repeatedly through box Fig. 2 by means of a suitable pump, as in Fig. 14, only in this case the primary cathodes in Fig. 2, marked minus, (—,) are connected with the plus (or +) pole of the dynamo, so as to make them secondary anodes, while the original anodes in box Fig. 2, marked plus, (+,) are replaced by secondary cathodes of sheet-iron which has been previously coated with a mixture of graphite and vaseline. These secondary cathodes on being connected with the negative (or —) pole of the dynamo become coated with the gold in a concentrated form, which had been previously distributed on a very large primary cathode area. The secondary cathodes may be like those marked — in Fig. 14 or may be of the form of the one shown in Fig. 6 or may be arranged of separate strips of iron or other conducting material arranged like the slats of a window-blind, so as to be pervious to the solution. I prefer to circulate the solution at such a speed that the evolution of hydrogen gas is substantially prevented at the cathode; but if, owing to the density of the electric current used, this is not possible I prefer to circulate it at a speed of not less than a foot per minute. When the gold content of the original cathodes, now secondary anodes, has been recovered, the secondary cathodes, now laden with concentrated gold, are removed, the original anodes are replaced, and the electric connections changed to what they were before, and the stock solution turned again through the tank, which now serves again as a deposition-box, as shown in Figs. 1 and 2. The same principle of the rapid circulation and repeated treatment of a large volume of solution through a small deposition-box containing pervious electrodes, through which it passes in rapid alternation, may also be applied to the electrochemical recovery of gold and silver from cyanid solutions without the use of a dynamo or external source of electricity, the electric energy being furnished by such an electropositive metal, as zinc, in the form of fine granules, shavings, or dust. This is shown in Fig. 15. This shows at T the large or storage tank containing the solution to be treated, a centrifugal or other pump P, and a vessel Z, containing zinc in the form of shavings or other form, exposing large surface. This rests on a filter F. A filter F' may be used at the top of the box to avoid the loss of fine particles, if desired. V' represents valves to control the flow. The solution is forced to circulate from the tank T through the zinc and back again repeatedly (preferably, though not exclusively) at such a rate as to substantially prevent the evolution of hydrogen. The gold and silver are rapidly precipitated by the electrolytic action set up between the solution and the zinc. The zinc particles act as anodes and the gold and silver particles, which are at once deposited in a porous or pervious state upon the zinc, act as cathodes. Now the zinc anodes covered with this pervious coating of gold and silver cathodes form together a combination of pervious anodes and cathodes, and when the solution is forced to circulate rapidly and repeatedly through the combination it is brought into intimate contact with anodes and cathodes in rapid alternation, and although the electromotive force of the combination is small the current is short-circuited, and therefore resistance is smaller than in any other form of cell, and hence the gold and silver are rapidly precipitated. In this form of my process it is important that the gold and silver should be precipitated on the zinc in a loosely adherent porous film, so that the zinc and the precipitated pervious metal should form a set of electrodes pervious to the solution. In some cases the precious metal forms a solid impervious film on the surface of the zinc. When this happens, precipitation ceases. In such cases I prefer to coat the zinc before use by dipping it in a dilute solution of nitrate of silver or acetate of lead to coat it with a pervious film of silver or lead to form the pervious cathode on the surface of the pervious zinc anode. When the zinc is sufficiently fine, this precaution is unnecessary. While by the ordinary zinc process, owing to local action, five to twenty ounces of zinc are required to precipitate one ounce of silver or gold, I have been able to effect substantially perfect precipitation of one ounce of silver by 0.57 ounce zinc, and I have obtained results nearly as good with gold. I prefer, however, to use in practice about two ounces of zinc to one of gold and silver; but I am thus enabled to save of zinc and also reduce the cost of refining the precipitate. Moreover, by the application of the same principle I am able to refine said precipitate without the use of acid by rapidly and repeatedly circulating a solution of cyanid, nitrate, or sulfate of silver, or cyanid or chlorid of gold or soluble salt of copper through the precipitate, so that said solution shall come into intimate contact in rapid alternation, with the residual particles of zinc acting as pervious anodes and the particles of deposited gold and silver acting as pervious cathodes until the residual zinc is substantially dissolved. After refining the precipitate in this manner I then recover the silver or gold left in the refining solution whenever necessary by treating it with fresh zinc, as before.

By the use of the word "electrochemical" in this specification and in the claims as referring to or qualifying the cell or deposition-box I wish to be understood as meaning a cell or box in which gold and silver are precipitated in the metallic state by the simultaneous action of electrical and chemical means, whether the electric power is generated by a source of electricity external to the deposition-box—by a dynamo, for instance, as in Fig. 1—or by a source of power within the box by chemical action such as would result from the action of the solution upon metallic zinc or other electropositive metal, as in Fig. 15.

My invention is not for nor is it to be confined to an apparatus nor to the details of the means and devices I have herein illustrated. These are but suitable means for carrying out my process and many other forms may be used. I do not claim the discovery of pervious electrodes nor peroxid-of-lead anodes nor any particular form or material of electrodes; nor do I claim to have discovered the value of circulating the solution contained within an electrolytic cell; nor, finally, do I claim discovery of the use of zinc or zinc shavings for precipitating gold and silver from cyanid solutions; but What I do claim as new, and desire to secure by Letters Patent, is—

1. The process of removing gold and silver from dilute cyanid solutions which consists in forcing said solution to circulate from a storage-tank through a suitable electrochemical cell and back again repeatedly, so that said solution is brought into intimate contact with anodes and cathodes in rapid alternation and at such a speed that fresh gold and silver bearing solution is brought into intimate contact with the cathodes as fast as the gold and silver are precipitated there and the evolution of hydrogen at the cathodes substantially ceases.

2. The process of removing gold and silver from dilute cyanid solutions which consists in forcing said solutions to circulate from a suitable storage-tank, through a suitable electrochemical cell and back again repeatedly, at a speed of not less than one foot per minute, so that said solution is brought into intimate contact with anodes and cathodes in repeated and rapid alternation.

3. The process of removing gold and silver from dilute cyanid solutions which consists in forcing said solution to circulate repeatedly through a suitable electrochemical cell containing pervious electrodes, so as to be brought into intimate contact with pervious anodes and pervious cathodes in repeated alternation at such a speed as shall bring fresh gold and silver bearing solution to the cathodes as fast as the gold and silver are precipitated there, and the evolution of hydrogen at the cathodes substantially ceases.

4. The process of removing gold and silver from dilute cyanid solutions which consists in forcing said solution to circulate repeatedly, through a suitable electrochemical cell containing pervious anodes and pervious cathodes through which said solution is forced to flow between them at a speed of not less than one foot per minute, and in such a manner as to be brought into intimate contact with said pervious anodes and pervious cathodes in rapid alternation.

5. The process of concentrating the gold and silver already precipitated on primary cathodes large in area, upon secondary cathodes small in area, which consists in making said primary cathodes, secondary anodes in a suitable electrochemical cell in which the secondary cathodes of smaller area are contained, and causing a cyanid solution to circulate through such a cell so as to be brought into intimate contact with such secondary anodes and secondary cathodes in rapid and repeated alternation, while it is circulating at such a speed as to bring fresh gold and silver to said secondary cathodes as fast as the gold and silver are precipitated there and so that the evolution of hydrogen at said secondary cathodes substantially ceases, and until the gold and silver distributed on the secondary anodes is concentrated on the small area of the secondary cathodes.

6. The process of concentrating the gold and silver already precipitated on cathodes large in area upon secondary cathodes small in area, which consists in making said original cathodes secondary anodes in a suitable electrochemical cell in which said secondary cathodes are also contained, and causing a cyanid solution to circulate through such cell at a speed of not less than one foot per minute so as to be brought into intimate contact with anodes and cathodes in repeated and rapid alternation till the gold and silver originally distributed on the large secondary anode area is concentrated on the smaller area of the secondary cathodes.

7. The process of recovering gold and silver from large volumes of dilute cyanid solutions, which consists: first, in forcing said solution to circulate rapidly and repeatedly through a suitable electrochemical cell containing primary cathodes of sufficient area placed in alternation with suitable anodes, so that said solution is brought into intimate contact with said anodes and cathodes in rapid alternation until its gold and silver content has been sufficiently deposited upon said primary cathodes of large area; second, in forcing a small volume of a cyanid solution to circulate rapidly and repeatedly through an electrochemical cell containing the primary cathodes from the first-named solution, which primary cathodes are now made secondary anodes in alternation with suitable secondary cathodes of smaller area, so that said last-named solution is brought into intimate contact with said secondary anodes and cathodes in rapid alternation, till the gold and silver deposited upon the said original cathodes is concentrated upon said secondary cathodes of smaller area.

8. The process of recovering gold and silver from dilute cyanid solutions which consists in forcing said solution to circulate rapidly and repeatedly through a suitable electrochemical cell containing pervious anodes and pervious cathodes whose surfaces have been covered by a layer of pervious or spongy metal so arranged as to increase the cathode-surface, through which the solution is forced to circulate in such a manner as to be brought into repeated contact with anodes and cathodes in rapid alternation during the passage of a suitable electric current.

9. The process of removing gold and silver from dilute cyanid solutions which consists in forcing said solution to circulate from a storage-tank through a suitable electrochemical cell containing zinc anodes in the form of fine grains or shavings coated with a pervious cathode coating of an electronegative metal, and back again rapidly and repeatedly, so as to be brought into intimate contact with said zinc anodes and electronegative-metal cathodes in rapid alternation.

10. The process of removing residual zinc from the gold and silver already precipitated on zinc grains or shavings, which consists in forcing a suitable solution of an electronegative metal to circulate rapidly and repeatedly through a suitable electrochemical cell containing said pervious precipitate, so as to be brought into intimate contact in rapid alternation with such residual zinc acting as anode and such electronegative metal acting as cathode until such residual zinc has been sufficiently extracted.

In witness whereof I have hereunto set my hand.

SAMUEL B. CHRISTY.

Witnesses:
WALTER F. VANE,
D. B. RICHARDS.